July 15, 1969

E. H. LAND 3,455,633

PHOTOGRAPHIC COLOR PROCESS AND APPARATUS AND PRODUCT USEFUL THEREIN

Filed July 16, 1965

INVENTOR.
Edwin H. Land
BY Brown and Mikulka
and
Robert E. Corb
ATTORNEYS

July 15, 1969

E. H. LAND 3,455,633

PHOTOGRAPHIC COLOR PROCESS AND APPARATUS
AND PRODUCT USEFUL THEREIN

Filed July 16, 1965

INVENTOR.
Edwin H. Land
BY Brown and Mikulka
and
Robert E. Carle
ATTORNEYS

United States Patent Office 3,455,633
Patented July 15, 1969

3,455,633
PHOTOGRAPHIC COLOR PROCESS AND APPARATUS AND PRODUCT USEFUL THEREIN
Edwin H. Land, Cambridge, Mass., assignor to Polaroid Corporation, Cambridge, Mass., a corporation of Delaware
Filed July 16, 1965, Ser. No. 472,600
Int. Cl. G03b 27/32
U.S. Cl. 355—77                                27 Claims

ABSTRACT OF THE DISCLOSURE

An additive system of color photography in which a photosensitive, image-recording element comprising silver halide emulsions sensitized to and arranged for exposure by light of at least two primary colors is exposed to light from a subject to produce two color-separation images and is then treated to form a positive image from the silver halide by a reversal process. Prior to treatment, either before or after exposure, incremental portions of the image-recording element, preferably arranged in a screen pattern, are fogged by light complementary to the primary colors so that only one of the silver halides in each incremental fogged portion is capable of contributing to the formation of the reversal image, and treatment results in formation of a screened, additive color-separation image representing the primary colors of the subject, which image is exhibited in a conventional manner to reproduce fully the colors of the subject depicted. The system is particularly adapted to cinematography and enables the photosensitive, image-recording element to be exposed in a conventional camera, either prior to or subsequent to the fogging exposure, with the latter being accomplished in processing apparatus including a light source for both fogging the image-recording element and illuminating the additive record during exhibition thereof. Formation of the additive record is performed rapidly, preferably by a diffusion transfer reversal process.

---

This invention relates to color photography and, more particularly, to methods, apparatus and products especially useful in color cinematography.

In additive color photography a plurality of visible color separation records or images are formed representing different color components of a scene and each record is exhibited together with the other record or records in light of the color represented thereby. The color separation records are usually three in number representing the primaries red, green and blue; they are formed in side-by-side relation and are exhibited in such a way as to be individually indistinguishable. A substantial number of additive photographic color processes have been proposed utilizing silver halide emulsions and involving formation of positive silver images by diffusion-transfer reversal to produce color photographs. As a rule, each of the processes proposed heretofore requires a special light-sensitive image-recording element including a screen arrangement of components such as filters, lenticules and/or specially sensitized emulsions, and/or requires photoexposure of the image-recording element in apparatus such as a camera specially equipped with filters and the like. In many of these processes, the positive silver transfer image is formed on a special support including filters, lenticules and the like and/or the apparatus (such as a projector or viewer) employed to exhibit the photographs in color is required to be specially equipped with the necessary color filters, etc.

An object of the invention is to provide a method of additive color photography, wherein positive images are formed by silver halide diffusion-transfer reversal, specially suited for cinematography and enabling exposure of a photosensitive image-recording element in a conventional, ordinarily equipped camera and exhibition of the positive images in full color with a conventional, ordinarily equipped projector.

Other objects of the invention are: to provide a method of additive color photography in which an image-recording element including a plurality of silver halides sensitive to light of at least two different colors is exposed to light from a scene to produce at least two color separation records in overlying layers, and prior to formation of silver transfer images, portions of the image-recording element each of which includes every one of the silver halides, are subjected to fogging exposures by light of different colors each substantially complementary to one of the colors represented by one of the images thereby fogging all but one of the silver halides in each of the portions to the extent that a silver transfer image can be formed from the one unfogged silver halide in each of the portions; to provide a method as described in which portions of the image-recording element are fogged prior to exposure by light from a scene; to provide a photosensitive image-recording element useful in the method described and comprising a plurality of silver halides sensitive to light in at least two different visible wavelength ranges and at least two laterally arranged portions each including every one of the silver halides, wherein adjacent portions are differently fogged so that only one of the silver halides in each portion is capable of contributing to the formation of a silver transfer image; and to provide a photosensitive image-recording element as described in which the differently fogged portions thereof are systematically arranged in a photographic screen pattern.

Other objects of the invention will in part be obvious and will in part appear hereinafter.

The invention accordingly comprises the process involving the several steps and the relation and order of one or more of such steps with respect to each of the others, the apparatus possessing the construction, combination of elements and arrangement of parts, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1A:
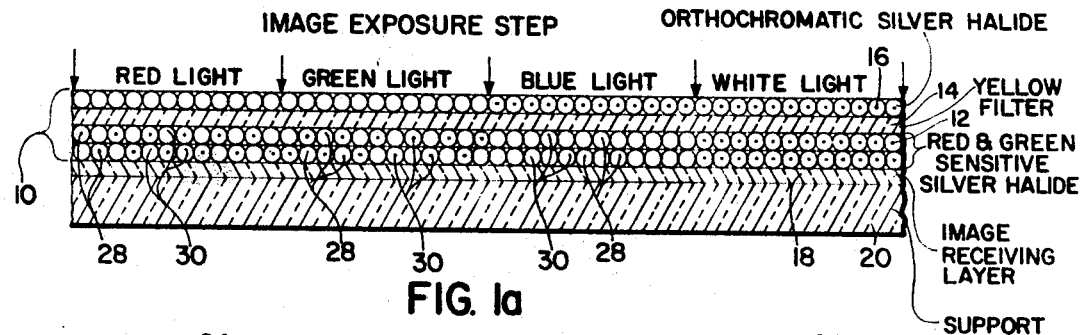
FIGURE 1 is a sectional view of photographic sheet material embodying the invention with FIGS. 1a, 1b, 1c and 1d illustrating steps in the method of the invention and the appearance of the sheet material as a result of each of the steps.
Figure 1B:
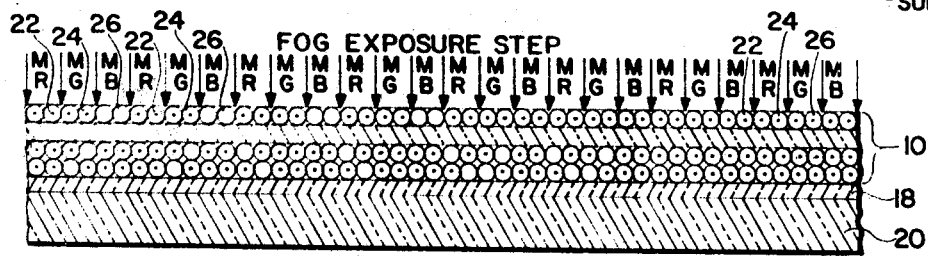

As previously noted, additive color processes generally involve the production in side-by-side relation of at least two and usually three color separation images representing the primary color components of a scene and require special film and/or camera structures to produce the color separation images. The special film structure in most common use, particularly for color cinematography, comprises a screen arrangement of filters, lens elements or specially sensitized emulsions, while the special camera structures include optical means such as filters, beam splitters and the like for separating light from a scene into its primary (3) color components. Special film structures adapted for use in conventional cameras are relatively expensive and frequently require more involved processing than simpler film structures which, on the other hand, require special camera structures for exposure. The method of the invention utilizes a light-sensitive image-recording element or film which, in its most basic form, comprises a layer containing differently sensitized silver halide grains and, possibly, a selective light-absorbing (filter) material; and moreover, contemplates exposing this element in an ordinarily equipped conventional camera. Basically, the process comprises photoexposing a light-sensitive element containing differently sensitized silver halides arranged to produce two or more latent color separation images (when exposed); forming positive silver images from the silver halides by a one-step, diffusion-transfer reversal process; and prior to processing—either before or after photoexposure by light from a scene—fogging selected silver halides in different areas of the light-sensitive element to the extent that all but one of the silver halides in each area are rendered incapable of contributing to the formation of a silver transfer image. The silver transfer images thus formed constitute positive color separation images that are exhibited in the respective colors that they represent in such a way as to reproduce the scene substantially in full color.

The steps in a typical additive color photographic process, according to the invention, are illustrated in FIGURE 1 of the drawings. Although the process illustrated by way of example results in the production of three color separation records preferably representing the primary red, green and blue components of a scene, it should be understood that, as in many other additive color processes, good color reproduction can be achieved with only two color separation records formed by light in portions of the visible wavelength range that may be described, for example, as reddish orange and greenish blue, and that the proces of the invention finds equal utility for producing color photographs with two as well as three color separation records. An image-recording element useful in the method of the invention for producing three color separation records may be composed of a red sensitive silver halide, a green sensitive silver halide and a silver halide which is substantially only blue sensitive, arranged so that each is exposed by light from a scene only in the particular wavelength range in which it is sensitive. A number of relatively simple film structures of this type are possible and one is shown by way of example in FIG. 1a, as comprising a light-sensitive layer 10 including, in order, a stratum 12 composed of substantially equal proportions of red sensitive silver halide grains and green sensitive silver halide grains; a stratum 14 of a minus blue, i.e., yellow, filter material and a stratum 16 containing silver halide sensitive substantially only to blue light. Light-sensitive layer 10 is exposed from the side of blue sensitive stratum 16 so that the silver halide therein is exposed substantially only by blue light and records the blue components of the scene. Yellow filter 14 is provided for absorbing blue light to which the red and green sensitive silver halides are sensitive and passes only red and green light to expose the red and green sensitive silver halides in stratum 14 forming therein records of the red and green components of the scene. By virtue of this arrangement, each of the three sets of differently sensitized silver halide grains forms a latent color separation image representing the component color in the scene to which it is sensitive.

Other simple arrangements of differently sensitized silver halides are possible and have equal utility in the method of the invention. For example, the photosensitive layer may comprise a mixture of the three differently sensitized silver halide grains together with the minus blue filter material. In this embodiment, the silver halide grains nearest the surface of the photosensitive layer are exposed by red, green and blue light, while the filter material absorbs blue light, preventing exposure of silver halides further from the surface by blue light, and only the red and green sensitive silver halides underlying the strata nearest the surface are exposed to red and green light. In this manner the blue color separation image is formed in the silver halides closest the surface through which light is directed and the red and green color separation images are formed in the silver halides more deeply underlying this surface. A number of modifications of these two basic structures are possible including, for example, providing each of the differently sensitized silver halides in a separate stratum; varying the order and color sensitivity of the silver halide strata and the color of the filter material; and varying the proportions of the differently sensitized silver halide grains.

The feasibility of an even more simplified photosensitive film structure is indicated by the discovery that good color reproduction can be achieved with a trichromatic system in which the information, e.g., densities, resolution, etc., contained in the blue record is substantially less than the information contained in the red and green records. A photosensitive layer designed to take advantage of this phenomena will comprise a mixture of highly sensitive (high speed), blue sensitive silver halide grains and relatively less sensitive red and green sensitive silver halide grains. The camera employed to expose this photosensitive layer will include a partial minus-blue (yellow) filter designed to transmit sufficient blue light to expose the fast blue sensitive silver halide but insufficient to expose the relatively slow red and green sensitive silver halides. It will be apparent that a film structure including a photosensitive layer of this type has the advantage of being simpler and less expensive to manufacture than a photosensitive layer including a plurality of separate strata, and that the requisite partial minus-blue filter is inexpensive, and is easily and readily coupled with the lens of a camera without requiring modification thereof.

Photosensitive layer 10 represents one layer of a plural layer film assembly the construction and composition of which will depend upon the manner in which the film is to be treated to form the transfer image and the manner in which the transfer image is to be exhibited. In the embodiment shown in FIG. 1a, photosensitive layer 10 is part of a film structure including an image-receiving layer 18 and a transparent support 20. The silver transfer image is formed in image-receiving layer 18 from photosensitive layer 10 and the latter is stripped from the image-receiving layer to leave a positive silver transfer image on a transparent support which is exhibited by light transmitted through the image-receiving layer and support. The combined image-recording and image-receiving element or sheet shown schematically in FIG. 1a is formed by coating the image-receiving layer and then the strata comprising the photosensitive layer on a conventional transparent film base material such as a cellulosic ester, e.g., cellulose acetate. Image-receiving layer 18 includes materials termed silver precipitating nuclei for promoting the precipitation and aggregation of silver and for detailed examples of image-receiving layers incorporated in film structures of the general type disclosed herein, reference may be had to U.S. Patent No. 2,726,154, issued Dec. 6, 1955 to Edwin H. Land.

The composite image-recording and image-receiving element is processed by appling an aqueous alkaline liquid including a silver halide developer such as hydroquinone and silver halide solvent such as sodium thiosulfate to the photosensitive layer for absorption therein to effect a diffusion-transfer reversal process in which exposed silver halide is reduced to silver and a soluble silver complex is formed from unexposed silver halide and transferred by diffusion to the image-receiving layer where it is reduced to silver and precipitated as a positive silver image. A number of well-known mechanisms are available for applying the aqueous processing liquid to the photosensitive layer including, for example, immersing the image-recording element in the liquid, applying the liquid to the photosensitive layer in either a non-viscous form or in a viscous jelly-like form by a suitable applicator or by spreading the liquid between the image-recording element and a second element superposed therewith. The image-receiving layer is shown as a component of a combined image-recording and image-receiving element in the preferred method because of the advantages accruing to a single sheet process. These advantages include simplicity, inexpensiveness and improved registration between the film support and the negative and positive images, and are discussed in greater detail in the aforementioned U.S. Patent No. 2,726,154. However, it is equally feasible within the scope of the invention to provide the image-receiving layer on a second element superposed with the image-recording element during processing thereof and forming the transfer image on this second element which is separated from the image-recording element following formation of the transfer image. Silver halide diffusion-transfer reversal processes and materials useful therein, for forming positive silver transfer images in the method of the invention are disclosed in U.S. Patents Nos. 2,543,181, issued Feb. 27, 1951 and 2,662,822, issued Dec. 15, 1953, both in the name of Edwin H. Land.

Stripping of the photosensitive silver halide emulsion layer from the image-receiving layer and support following processing may be substantially facilitated by providing a water soluble stripping layer between the photosensitive and image-receiving layers; and/or by making the gelatin layer substantially more rigid and self supporting by including deacetylated chitin therein as proposed in U.S. Patent No. 3,003,875, issued Oct. 10, 1961, in the name of William H. Ryan.

The first and second steps in the process of the invention are exposure steps, namely, an image-forming exposure and a fogging exposure; and the order in which these steps are performed makes no difference to the process, per se, although it may be preferred, for practical reasons, to perform the fogging exposure first since this can be accomplished during manufacture of the film and will eliminate one of the steps which the user must accomplish. However, in order to illustrate the process more clearly, the image-forming exposure step is shown and described as being performed before the fogging exposure step. It should be appreciated that the invention is concerned with a diffusion-transfer reversal process in which an imagewise distribution of transferable image-forming substances are transferred by diffusion from unexposed portions of a silver halide layer, and while the image-forming substances in the preferred example includes silver, they may also include dyes and dye intermediates that are transferred by diffusion to a suitable receiving layer to form a positive monotone image therein. The patents cited herein disclose a number fo such processes suitable for incorporation in the method of the invention.

The combined image-recording and image-receiving element following the image-forming exposure step, is illustrated schematically in FIG. 1a, in which circles are employed to represent silver halide grains and small dots are employed in the circles to represent silver halide grains rendered developable by exposure to actinic light, while the grain remaining undevelopable and unexposed are represented by the unmarked circles. To this convention which is followed throughout the drawings, a showing for developed silver grains is added which employs crosses in the circles and large solid dots for silver grains in the transfer image. For purposes of illustration and understanding the invention, it may be assumed that silver halide grains (indicated as circles) that are exposed (circles with dots) and developed (circles with crosses) are incapable of contributing image- forming substances (silver) to the formation of a transfer image (solid dots). Throughout FIGURE 1, the various layers and strata of photographic materials have been shown greatly exaggerated in thickness for the purposes of illustration; and similarly, the silver halide grains and the silver developed therefrom have been greatly exaggerated as to size and shape. For the purposes of simplicity and to facilitate understanding of the invention, these various grains are shown as being uniformly distributed and arranged in systematically positioned rows which extend depthwise of the layers illustrated; however, it should be understood by those skilled in the art, that silver halide and silver derived therefrom will appear in grains many times smaller than those illustrated and that the grains will not be symmetrical in shape or arrangement.

FIGURE 1 illustrates photosensitive layer 10 as being exposed to light from a scene including four areas or subjects that are respectively red, green, blue and white so that the light incident on side-by-side sections of the photosensitive layer is red, green, blue and white. It will be noted that the blue sensitive silver halide in stratum 16 is exposed by blue and white light forming latent images representing the blue and white components of the scene, while remaining unexposed in areas where the red and green light is incident. The red and green sensitive silver halides in stratum 12 remain unexposed by the blue light which is absorbed by yellow filter 14 and are completely exposed in the area on which white light is incident. The blue sensitive silver halide in stratum 16 is not exposed by the red and green light whereas the red sensitive silver halide is exposed in the area on which the red light is incident and the green sensitive silver halide is exposed in the area on which the green light is incident, thus forming latent color separation records in a single stratum representing the red and green components of the scene. The three color separation records at this stage in the process are disposed in overlying (depthwise) relation and must be separated from one another and arranged laterally in order to be distinguished from one another and/or exhibited to reproduce the original colors of the scene. This is accomplished by the fogging and processing steps illustrated respectively in FIGS. 1b and 1c.

In additive color photography, each of the positive color separation images is usually exhibited in light of the primary or similar color represented thereby and the plurality of images are exhibited simultaneously (or very nearly so) and in registration to reproduce the original colors of the scene. This may be accomplished by providing a separate light source of the required wavelength range for each color separation image and in the case of additive color photography, might involve forming two or three individual color separation images in rapid succession and exhibiting the images in rapid succession each in light of its appropriate color so as to take advantage of visual persistence to make the scene appear in its original colors; or two or three color separation records may be formed in side-by-side relation on each successive frame. However, such a method would require a separate optical system for each image both to form the images and to exhibit the plural color separation images simultaneously and in registration. The preferred method (shown) is to dissect each color separation image into a multiplicity of small components, e.g., lines regularly arranged in a mosaic screen pattern such that individual image components are indistinguishable from one another. This is accomplished by employing a color filter screen comprising a mosaic of differently colored filters and is preferred because it requires but a single image-forming optical system for both taking and exhibition and a single light source for exhibition.

Figure 2:
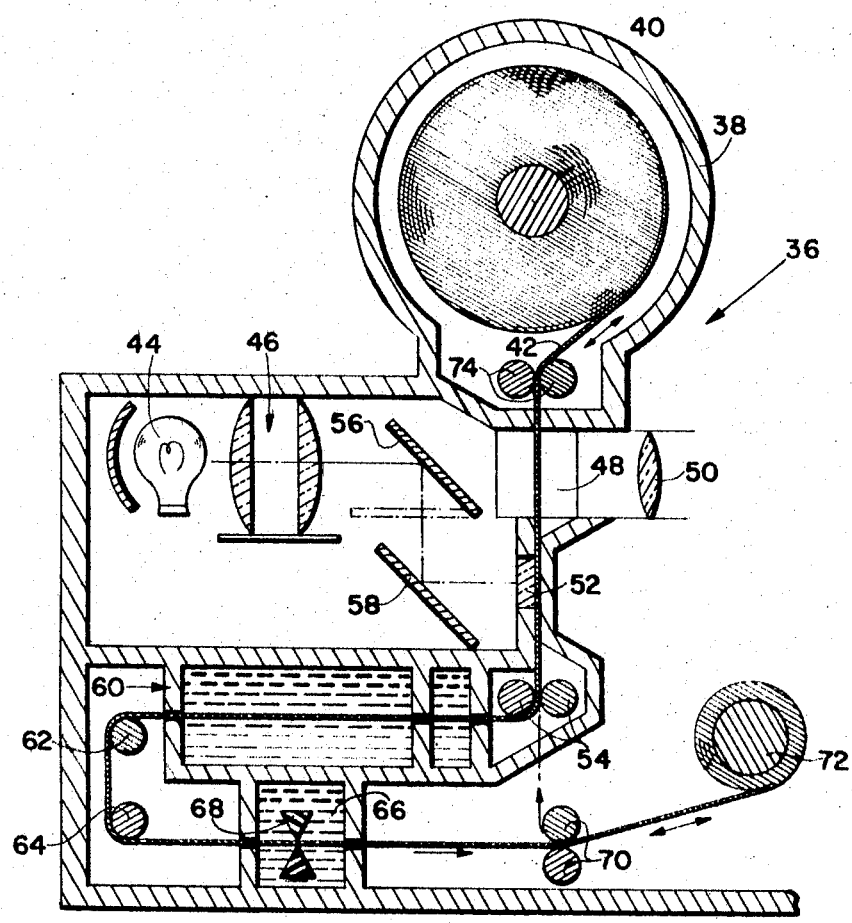
FIG. 2 is a diagrammatic sectional view illustrating apparatus embodying the invention for performing the method thereof.

In the fogging exposure step illustrated in FIG. 2, areas of the photosensitive layer arranged in a photographic screen pattern are exposed to light in wavelength ranges complementary to the wavelength ranges to which the silver halides in the photosensitive layer are sensitive, and in this case portions of the photosensitive layer, designated 22, 24 and 26, are exposed respectively to light that is minus red (cyan), minus green (magenta) and minus blue (yellow). As illustrated, the minus red light fogs the green and blue sensitive emulsions so that a transfer image can be formed only from the red sensitive silver halide grains, designated 28, in the portion of the photosensitive layer in which the minus red light is incident.

Similarly, only green representative transfer images can be formed from the green sensitive silver halide grains, designated 30, from the portions of the photosensitive layer fogged by minus green light, and blue representative transfer images can be formed from the blue sensitive silver halide grains in strata 16 from the portions of the photosensitive layer fogged by minus blue light.

For cinematographic processes in which the film is to be exposed in a conventional motion picture camera, the photosensitive layer is preferably fogged by moving the film past an illuminated, lined screen oriented with the lines extending substantially parallel with the direction of film motion and, as noted, this fogging exposure may be performed either prior to the image-forming exposure, preferably during manufacture, or subsequent to the image-forming exposure prior to processing. In the latter case, both the fogging exposure and processing may be performed in a single apparatus such as shown in FIG. 2, combining components of a projecor (or viewer) and a processor. Such a combined projector and processor would include a light source and means for advancing the film through the projector and processor during fogging, exposure, processing and exhibition, and a suitable color filter screen that can be employed in conjunction with the light source to expose the film prior to and during processing. Fogging the film prior to exposure offers the advantage of making it possible to expose the film in a conventional camera, process the film in a special processor to produce a positive diffusion-transfer image, and exhibit the image with a conventional projector to produce the scene in its original colors merely by employing a projection screen having appropriately colored areas corresponding to the pattern of fogging.

Figure 1C:
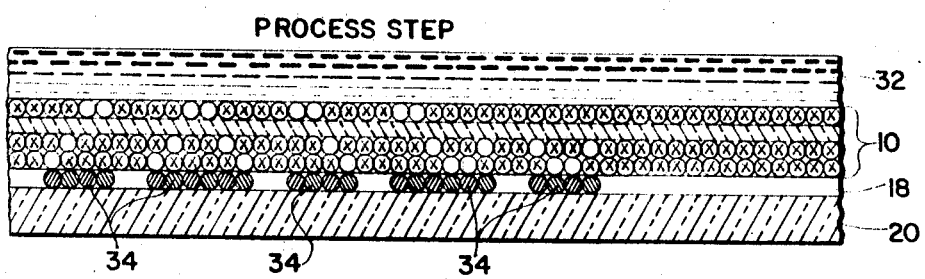
Figure 1D:
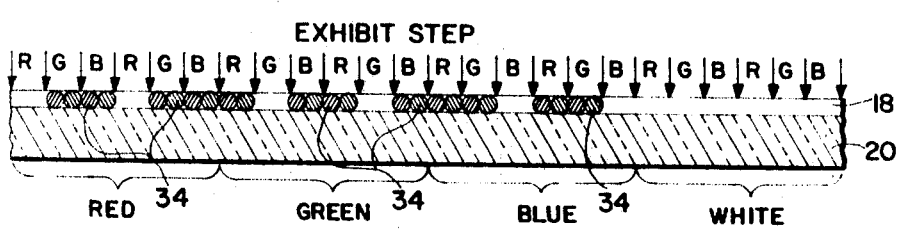

Photosensitive layer 10 is treated with a liquid to form diffusion-transistor reversal images in an image-receiving layer superposed therewith, as shown for example in FIG. 1c. In this processing step, image-receiving layer 18 is a component of a combined image-recording and image-receiving element and the diffusion transfer reversal process is effected by a liquid shown as a layer 32 distributed in contact with the photosensitive layer. Liquid 32 may be applied for permeation into layer 10 as a viscous or nonviscous liquid by a suitable applicator; where it may be spread between the photosensitive layer and another element superposed therewith which may function merely to aid in the distribution of the processing liquid or act as a support for an image-receiving layer in which the transfer image is formed; or by passing the combined image-recording and image-receiving element through a container of liquid, as shown in FIG. 2, and/or by employing apparatus such as shown and described in U.S. Patent No. 3,120,795, issued Feb. 11, 1964, in the name of Edwin H. Land. The single sheet process is preferred because it means that only a single sheet must be provided and handled and accurate registration between the fogged portions of the image-recording layer and the transfer images in the image-receiving layer is assured. During this processing step, exposed silver halides in the photosensitive layer are reduced to silver (indicated by circles and crosses) and unexposed silver halide is dissolved and diffuses to image-receiving layer 18, where it is precipitated as silver to form monotone images designated 34. It will be noted from FIG. 1c that such, if not all, of the silver halides in portions of the photosensitive layer exposed to red light from the scene and fogged by minus red light are exposed to some extent so that areas of image-receiving layer 18 that are exhibited in red light, as shown in FIG. 1d, remain substantially free of the transferred image-forming substance (silver) so as to pass red light and appear red when exhibited. The green and blue records also appear in their original colors by virtue of a similar process, while in areas exposed to white light from the scene, all of the silver halides are exposed so that there is substantially no transfer of image-forming substances and formation of transfer images, and these areas will transmit all three primary colors and appear white. Areas remaining unexposed to light from the scene will contain substantially uniform distributed unexposed silver halide from which a positive transfer image is formed capable of preventing transmission of substantially all light during exhibition so that these areas will appear black as in the subject.

In the exhibition step illustrated in FIG. 1d, light is transmitted through a red, green and blue lined filter screen to and through image-recording layer 18 and support 20. The line screen elements are preferably contiguous and submacroscopic in width, so that individual lines are indistinguishable from one another when the images are viewed. Alternatively, the positive transfer image may be exhibited by transmitting white light through the image-recording layer and support to project the image onto a screen having alternate red, green and blue lines, having the same relative size, shape and arrangement as the fogging filter screen thereby allowing the use of a conventional projector. The screen and projector should be accurately positioned with respect to one another to insure the proper amount of image magnification and registration of the images with the colored lines. The direction in which light is transmitted through the positive images is, of course, dependent upon the nature of the geometric reversals which occur during exposure, processing and exhibition and depend upon the nature of the optics employed during taking and exhibition and which side of the image-recording layer is superposed with the image-receiving layer during formation of the transfer image. It should be noted that it is also possible to form a reflection print capable of being viewed substantially in full color by the process claimed, in which case the filter screen employed for exhibition will be incorporated in the image-receiving layer or in a layer associated therewith, and the image-receiving and filter layers will be provided on a suitable light-reflecting support.

While the method of the invention has been described as involving formation of positive images from the silver halide by diffusion transfer reversal, it should be apparent that the positive images can be formed in the image-recording element by a conventional reversal process. Although such a process would involve more treatment steps than a diffusion transfer process and require processing apparatus which may be more complex than apparatus for forming positive (reversal) images by diffusion transfer, conventional reversal methods do constitute another way of practicing the method of the invention and are considered to fall within the scope of claims defining the invention.

Reference is now made to FIG. 2 of the drawings wherein there is illustrated a combined projector and processor for practicing the method of the invention. The processor-projector, designated 36, generally comprises a light-tight housing 38 for enclosing a spool 40 on which is coiled a length of the combined image-recording and image-receiving sheet, designated 42, which has been photoexposed in apparatus such as a camera and is coiled on spool 40 so as to come off the spool in a direction opposite to the direction of movement during exposure, i.e., trailing end first.

Mounted beneath housing 38 are the conventional components of a motion picture projector including a lamp 44, condensing lens 46, means designated 48 including a film gate, means for advancing the film frame by frame and a shutter and a projection lens 50. Film 42 extends from spool 40 downwardly through means 48 within a light-tight housing across a window 52 between a pair of guide and drive sprockets 54. The projector shown in FIG. 2 is designed to perform the fogging exposure steps and includes a 45° mirror 56 positioned between the condensing lens and means 48 for reflecting light from source 44 downwardly to a second 45° mirror 58 which reflects the light toward window 52 in which a suitable lined filter screen is mounted. Mirror 56 may be pivoted out of the path of light from the condensing lens to the position shown in broken lines to permit projection of the film and, if desired, another filter may be provided in the path of light between condensing lens 46 and projection lens 50 for exhibiting the film in color. In an alternative embodiment, the film may be subjected to fogging exposure during movement through the film gate of the projector and for this purpose a suitable filter may be provided between the condensing lens and the film gate. As previously noted, the positive transfer images may be projected in white light onto a lined screen of either the front or rear projection type, and in the embodiment in which the fogging filter screen is positioned between the condensing lens and film gate to fog the photosensitive layer during movement through the film gate, the same screen may be employed to register the projection screen by aligning the image of the filter with the lines on the projection screen.

Figure 3:
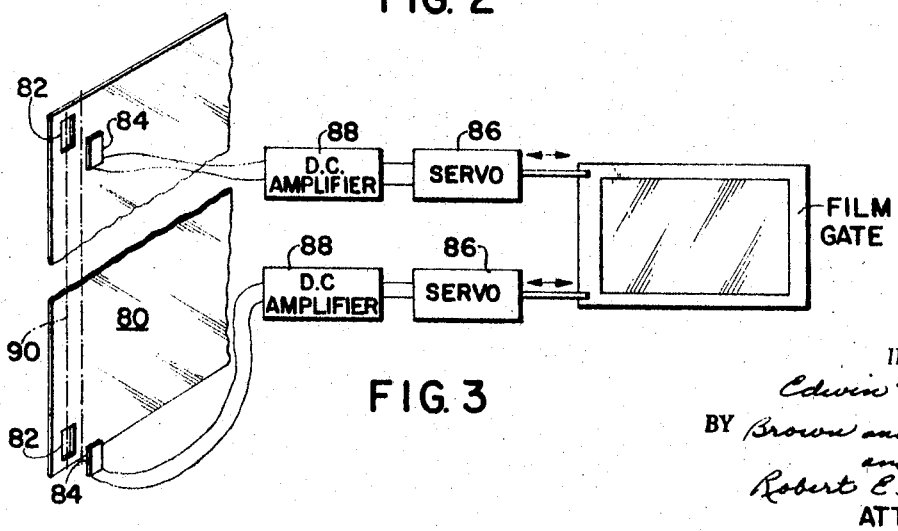
FIG. 3 is a schematic view of components of a viewing apparatus.

Other modifications of the projector and film include, for example, means in the projector for automatically threading the film and a preexposed leader including a pattern which may be utilized to properly locate a lined projection screen with respect to the screened image formed by the projector. Automatic means for maintaining the projected image in registration with the lined projection screen are illustrated in FIG. 3 as comprising a lined projection screen 80 having at least a lateral marginal portion that is opaque to light of at least a particular wavelengh and is formed with regions shown as two vertical slits 82 (shown greatly exaggerated) located near one lateral edge at the lower and upper portions of the projection screen for transmitting light of this particular wavelength. A photocell 84 sensitive to the particular wavelength is centrally located behind each of slits 82 and is coupled with a servo 86 for moving a component of the projection system, such as the film gate or screen, or for appropriately moving an optical image-displacing element such as a parallel surfaced light-transmitting plate and/or a wedge prism. Direct current amplifiers 88 are shown for operating the servos but may not be necessary for shifting an optical displacement device or a film gate through the minute distances required (e.g., approximately .035 mm. for the film gate) to properly register the projected image with the lined screen. The registration system illustrated corrects for both left-right and roational misregistration and utilizes a fiducial mark in the form of a line having a well-defined edge located on one side of the film so as to be projected onto the screen as a fiducial image in the form of a line 90 having a sharply defined edge predeterminedly located (parallel) with respect to the lines of the screen, specifically midway between the slides of slits 82. The fiducial line image is projected onto the screen in light of the particular wavelength to which the photocells are sensitive, and both the fiducial line and the dark or non-actinic area immediately adjacent the edge of the fiducial line are wider than the slits. The photocells and servos are adjusted so as to be in balance when the edge of the fiducial line is at a predetermined location with respect to the slits and photocells, such as the center lines of the slits. By mounting the image displacing means, e.g., film gate, for omnidirectional movement in a plane and coupling the servos to opposite edges, e.g., upper and lower, for independent movement, it is possible to achieve both linear and rotational movement of the projected images relative to the screen. The photocells and servos, which move the projected fiducial line relative to the slits, thus constitute a feedback system adjusted to register the edge of the fiducial line image with the centers of the slits and photocells, to insure proper location of the fiducial line with respect to the images. In order to insure accurate positioning of the fiducial line, it is preferably formed on the film by exposure of the photosensitive film at the same time the film is subjected to the fogging exposure responsible for formation of the line images. This may be easily accomplished to produce, for example, a light-transmitting line image having a sharp edge with a light opaque surround.

A processor of the type diclosed in the aforementioned U.S. Patent No. 3,120,795 is mounted beneath the projector and includes a dual chamber container 60 of processing liquids through which film 42 is guided from between sprockets 54 to a sprocket 62 located outside of the liquid-filled container within a light-tight housing. Container 60 includes reagents for effecting a sliver halide diffusion-transfer reversal process. From sprocket 62 the film is guided around another sprocket 64 and thence through a chamber 66 containing a liquid for softening the photosensitive layer and/or a stripping layer disposed between the photosensitive and image-receiving layers and squeegees or other rubbing means 68 for removing the photosensitive layer from the image-receiving layer during movement of the film through chamber 66. It will be noted that the film is advanced along a path of predetermined length from container 60 to chamber 66 and the length of this path and the rate of film movement are so related as to provide for a predetermined imbibition time during which image formation occurs. From chamber 66 the film is advanced between a pair of drive sprockets 70 to a take-up spool 72 on which it is coiled trailing end first. Suitable drying means including, for example, a blower for passing cooling air through the lamp housing of the projector and directing the air thus heated against the film between chamber 66 and sprockets 70, may be provided for drying the film prior to coiling on spool 72. Immediately as processing of a length of film is completed, the film may be threaded between sprockets 70 upwardly between sprockets 54 bypassing the processing components of the apparatus through means 48 between a pair of drive sprockets 74 onto spool 40 on which it is coiled during projection. By virtue of this construction, it is possible to process the film without rewinding immediately as a coil of the film is removed from the camera in which it is exposed and to exhibit the film without rewinding immediately as processing thereof is completed. Container 60 and chamber 66 are constructed to permit threading of the film therethrough and may be opened and/or removed from the apparatus in order to permit replenishment of the processing liquids and removal of the emulsion stripped from the film in chamber 66.

In an alternative form of the processor-projector, the film may be withdrawn trailing end first from the spool, cassette or other storage means, in which it is stored (in the camera) immediately following exposure and coiled on a spool (e.g., 72) in the processor. Fogging exposure may be performed during this rewinding step. Thereafter the film is moved leading end first through the processor wherein the positive image is formed and portions of the film are immediately projected while other portions of the film are being processed. Such a processor-projector will include the same basic components as the processor-projector illustrated in FIG. 2, although they will be arranged somewhat differently together with other components, such as means for temporarily storing the film between processing and projection steps in order to permit the film to be projected completely without interruption. The processor-projector of this type may take the form of a console projector with a built-in rear projection screen and may be substantially automatic in its operation, requiring only that the operator introduce an end (trailing) of the film into the processor-projector.

Since certain changes may be made in the above process, apparatus and product without departing from the scope of the invention herein involved, it is intended that all matter contained in the above description or shown in the accompanying drawings shall be interpreted as illustrative and not in a limiting sense.

What is claimed is:

1. The method of producing an additive color separation record of a scene for exhibition to reproduce said scene in substantially its original colors comprising, in combination:
exposing a composite image-recording element, every incremental portion of which comprises silver halides sensitive to and arranged for exposure by light in at least first and second visible spectral ranges, to light from said scene to produce at least two color separation images of said scene in said image-recording element;
treating said exposed image-recording element in conjunction with an image-receiving layer to form positive transfer images from said image-recording element in said image-receiving layer by a diffusion-transfer reversal process; and
prior to treatment of said image-recording element subjecting at least a first portion of said image-recording element to a fogging exposure by light of a spectral range substantially complementary to said first spectral range to prevent formation of more than one transfer image from said first portion and subjecting at least a second portion of said image-recording element to a fogging exposure by light of a spectral range substantially complementary to said second spectral range to prevent formation of more than one transfer image from said second portion.

2. The method of claim 1 wherein said color separation images are formed in overlying relation and said first and second portions are systematically arranged in a photographic screen pattern.

3. A method of color photography comprising:
exposing a composite image-recording element, every incremental portion of which comprises silver halides sensitive to and arranged for exposure by light in at least first and second visible spectral ranges, to light from a scene to produce at least two color separation images of said scene in said image-recording element;
treating said exposed image-recording element to form positive transfer images therefrom by a diffusion-transfer reversal process;
prior to treatment of said image-recording element, subjecting at least a first portion of said image-recording element to a fogging exposure by light of a spectral range substantially complementary to said first spectral range to prevent formation of more than one transfer image from said first portion and subjecting at least a second portion of said image-recording element to a fogging exposure by light of a spectral range substantially complementary to said second spectral range to prevent formation of more than one transfer image from said second portion; and
exhibiting said positive transfer image formed from each of said portions in light of substantially the same spectral range as said light forming said color separation image in said each portion, said transfer images being exhibited so as to reproduce said scene in substantially its original colors.

4. The method of color photography defined in claim 3 in which said image-recording element is subjected to said fogging exposures prior to exposure to light from said scene.

5. The method of color photography defined in claim 3 in which said image-recording element is subjected to said fogging exposures subsequent to exposure to light from said scene.

6. The method of color photography defined in claim 3 in which said color separation images are formed in overlying relation and said first and second portions are systematically arranged in a photographic screen pattern and said transfer images are exhibited simultaneously to reproduce said scene in substantially full color.

7. The method of color photography defined in claim 3 in which said first and second portions are exposed sequentially to light from said scene and said transfer images are exhibited in rapid sequence to reproduce said scene in substantially full color.

8. The method of color photography defined in claim 3 in which said silver halides are sensitive to primary red, green and blue light and said fogging exposures are made by minus red, minus green and minus blue light.

9. A method of color photography comprising:
exposing a composite image-recording element, every incremental portion of which comprises at least two silver halides each sensitive to and arranged depth-wise for exposure by light of one of the primary colors, to light from a scene to produce at least two color separation images of said scene in said image-recording element;
treating said exposed image-recording element to form positive transfer images therefrom by a diffusion-transfer reversal process in a layer superposed with the area of said image-recording element containing said images of said scene;
prior to treatment of said image-recording element, subjecting different portions thereof to a fogging exposure by light of the subtractive colors complementary to said primary colors to the extent of preventing formation of more than one transfer image from each of said portions; and
exhibiting said positive transfer image formed in said layer from each of said portions in light of substantially said primary color forming said color-separation image in said each portion, said transfer images being exhibited so as to reproduce said scene in substantially its original colors.

10. The method of color photography defined in claim 9 wherein said image-recording element is subjected to said fogging exposures prior to exposure to light from said scene.

11. The method of color photography defined in claim 9 wherein said image-recording element is subjected to said fogging exposures subsequent to exposure to light from said scene.

12. The method of color photography defined in claim 9 wherein said portions of said image-recording element are systematically arranged in a photographic screen pattern and said transfer images are exhibited simultaneously to reproduce said scene in substantially full color.

13. The method of color photography defined in claim 11 wherein said transfer images are exhibited by passing white light through said layer to form an image on a plane surface having areas arranged substantially in said screen pattern and each of a primary color corresponding substantially to said primary color represented by said image on said each area of said surface.

14. The method of color photography defined in claim 9 wherein said portions of said image-recording element are exposed sequentially to light from said scene and said transfer images are exhibited in rapid sequence to reproduce said scene in substantially full color.

15. A photosensitive image-recording element for use in color photography comprising, in combination:
a light transmitting support;
a light-sensitive layer on said support including a plurality of silver halides sensitive to and arranged for exposure by light in at least first and second visible spectral ranges to form at least two color separation records in every incremental area of said layer;
an image-receiving layer including silver precipitating nuclei located between said light-sensitive layer and said support;
said light-sensitive layer comprising at least two portions each fogged to the extent of being capable of forming a silver transfer reversal image on said image-receiving layer from only one of said silver halides.

16. A photosensitive image-recording element as defined in claim 15 wherein said light-sensitive layer includes a material for absorbing light in one of said spectral ranges.

17. A photosensitive image-recording element as defined in claim 15 wherein said portions are systematically arranged and laterally interspersed in a photographic screen pattern.

18. A photosensitive image-recording element as defined in claim 15 wherein said silver halides are sensitive to primary red, green and blue light and each of said portions is fogged by exposure to one of minus red, minus green and minus blue light.

19. A photosensitive image-recording element for use in color photography comprising, in combination:
a plurality of silver halides each sensitive to one of primary red, primary green and primary blue light, and a blue light-absorbing material arranged in at least a first layer to produce three color separation records representing the primary red, green and blue components of a scene when exposed to light therefrom;
said first layer including portions arranged systematically in a photographic screen pattern and all but one of said silver halides in each of said portions being fogged to the extent of being incapable of forming a silver diffusion-transfer reversal image in an image-receptive layer superposed with said first layer.

20. A photosensitive image-recording element as defined in claim 19 comprising an image-receptive layer including silver precipitating nuclei superposed with said first layer.

21. The photosensitive image-recording element of claim 19 wherein one of said silver halides is sensitive only to primary blue light and is disposed in an outer strata, and said silver halides sensitive to primary red and green light and said blue light-absorbing material are disposed in strata underlying said outer strata.

22. In a photographic sheet for use in color photography, in combination:
a plurality of gelatino silver halide emulsions sensitive to red, green and blue light and a blue light-absorbing material arranged in at least a layer, every incremental portion of which includes all of said silver halides, to produce three color separation records representing the primary red, green and blue components of a scene when exposed to light therefrom; and
a support from said first layer;
said first layer including portions systematically arranged in a photographic screen pattern fogged by one of minus red, minus green and minus blue light.

23. A photographic sheet as defined in claim 22 comprising an image-receiving layer including a silver precipitating agent located between said first layer and said support.

24. The method of producing an additive color separation record of a scene for exhibition to reproduce said scene in substantially its original colors comprising, in combination:
exposing a composite image-recording element, every incremental portion of which comprises silver halides sensitive to and arranged for exposure by light in at least first and second visible spectral ranges, to light from said scene to produce at least two color separation images of said scene in said image-recording element;
treating said exposed image-recording element to form positive images from said silver halides by a reversal process; and prior to treatment of said image-recording element subjecting at least a first portion of said image-recording element to a fogging exposure by light of a spectral range substantially complementary to said first spectral range to prevent formation of more than one positive image from said first portion and subjecting at least a second portion of said image-recording element to a fogging exposure by light of a spectral range substantially complementary to said second spectral range to prevent formation of more than one positive image from said second portion.

25. The method of claim 24 wherein said color separation images are formed in overlying relation and said first and second portions are systematically arranged in a photographic screen pattern.

26. In a method of producing an exhibiting color motion pictures in which a succession of frames of a light-sensitive film strip are exposed by light from a scene and subjected to a reversal process to produce at least two positive color separation images of the scene, the steps comprising:
exposing longitudinal areas of said light-sensitive film strip to light of colors complementary to the colors represented by said color separation images to fog portions of said film strip arranged in a line screen pattern;
while exposing said longitudinal areas, exposing a marginal portion of said light-sensitive strip to form a fiducial image on said film strip predeterminedly positioned with respect to said line screen pattern;
projecting said positive color separation images and said fiducial image onto a projection screen having interspersed lines of substantially the same colors represented by said color separation images and corresponding to said line screen pattern in relative size, shape and arrangement;
sensing the position of the projected fiducial image on said screen during projection of a sequence of said color separation images; and
maintaining the projected fiducial image at a predetermined position on said screen relative to said colored lines to maintain said projected color separation images in proper registration with said colored lines.

27. The method of claim 26 wherein said fiducial image is in the form of a line having a well defined edge extending substantially parallel with said line screen pattern and said colored lines; an image of said fiducial line is projected onto a lateral portion of said projection screen including two of said regions located near the upper and lower margins of said screen; and the position of said projected fiducial line image is sensed by said photoelectric means located behind said regions of said projection screen and capable of producing signals for controlling means for shifting the position of said projected images relative to said screen.

References Cited

UNITED STATES PATENTS

| 2,143,762 | 1/1939 | Capstaff | 96—26 |
| 3,165,406 | 1/1965 | Murray | 96—80 |

NORMAN G. TORCHIN, Primary Examiner

ALFONSO T. SURO PICO, Assistant Examiner

U.S. Cl. X.R.

96—3, 26; 352—42